US009280491B2

(12) United States Patent
Levenglick (10) Patent No.: US 9,280,491 B2
(45) Date of Patent: *Mar. 8, 2016

(54) SYSTEM AND METHOD FOR REGULATING ACCESS TO MEMORY MAPPING INFORMATION AT A MEMORY MANAGEMENT UNIT (71) Applicant: FREESCALE SEMICONDUCTOR, INC., Austin, TX (US)

(72) Inventor: Dov Levenglick, Givat Ada, IL (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/715,196

(22) Filed: May 18, 2015

(65) Prior Publication Data

US 2015/0248355 A1 Sep. 3, 2015

Related U.S. Application Data (63) Continuation of application No. 13/817,940, filed as application No. PCT/IB2010/053852 on Aug. 26, 2010, now Pat. No. 9,043,577.

(51) Int. Cl.
*G06F 12/10* (2006.01)
*G06F 12/14* (2006.01)

(52) U.S. Cl.
CPC .......... *G06F 12/145* (2013.01); *G06F 12/1009* (2013.01); *G06F 12/1036* (2013.01); *G06F 12/1072* (2013.01); *G06F 12/1491* (2013.01); *G06F 12/109* (2013.01); *G06F 2212/1016* (2013.01); *G06F 2212/1052* (2013.01); *G06F 2212/151* (2013.01); *G06F 2212/657* (2013.01)

(58) Field of Classification Search
None
See application file for complete search history.

(56) References Cited

U.S. PATENT DOCUMENTS

| 6,405,317 | B1 | 6/2002 | Flenley et al. |
| 6,877,158 | B1 | 4/2005 | Arndt |
| 2006/0047959 | A1 | 3/2006 | Morais |
| 2006/0064567 | A1 | 3/2006 | Jacobson et al. |
| 2009/0182915 | A1 | 7/2009 | Farrell et al. |
| 2010/0058358 | A1 | 3/2010 | Franke et al. |
| 2010/0125709 | A1 | 5/2010 | Hall et al. |

OTHER PUBLICATIONS

Webopedia, "Hypervisor", Sep. 8, 2006, https://web.archive.org/web/20060908211310/http://www.webopedia.com/TERM/H/hypervisor.html.*

* cited by examiner

*Primary Examiner* — Edward Dudek, Jr.
*Assistant Examiner* — Christopher D Birkhimer (57) ABSTRACT A first storage location at a memory management unit stores physical address information mapping logical physical addresses to actual physical addresses. A second storage location stores an allowed address range of actual physical addresses. A memory management unit determines whether a write access to the first storage location is allowable. The access is to store memory mapping information relating to a first actual physical address. The memory management unit prevents the write access if the first actual physical address is not in the allowed address range, and does not prevent the write access if the first actual physical address is in the allowed address range. The memory management unit prevents a write access to the second storage location by a process that is not running in a hypervisor mode.

20 Claims, 2 Drawing Sheets

SYSTEM AND METHOD FOR REGULATING ACCESS TO MEMORY MAPPING INFORMATION AT A MEMORY MANAGEMENT UNIT

CROSS-REFERENCE TO RELATED APPLICATION

The present application is a continuation of U.S. patent application Ser. No. 13/817,940, entitled "MEMORY MANAGEMENT UNIT FOR A MICROPROCESSOR SYSTEM, MICROPORCESSOR SYSTEM AND METHOD FOR MANAGING MEMORY," filed on Feb. 20, 2013, which is a National Stage Entry under 37 C.F.R. §371 of PCT/IB2010/053852, filed Aug. 26, 2010, the disclosures of which are hereby expressly incorporated by reference in their entirety. the entirety of which is herein incorporated by reference.

FIELD OF THE INVENTION

This invention relates to a memory management unit for a microprocessor system, a microprocessor system with a processor core and a memory management unit and a method of managing memory in a microprocessor system.

BACKGROUND OF THE INVENTION

Modern computer systems are often powerful enough to run more than one operating system in parallel. For this purpose, the physical resources of a computer system, e.g. processor cores, memory, peripheral devices, network resources, etc. are usually distributed over logical partitions. For a logical partition, a virtual machine representing an image of hardware and resources allocated to the logical partition may be provided. The virtual machine often closely mirrors the underlying hardware. It is however possible that the virtual machine presented represents hardware with a very different setup than the physically present hardware or actual hardware of the computer system.

On a logical partition, an operating system may be run, which may be called a guest operating system. It is possible and quite common for different logical partitions to run different operating systems, e.g. one logical partition may be running a GNU/Linux-based system and another logical partition may be running a more tradition Unix-like operating system such as AIX or for example a specialized operating system for embedded systems such as SmartDSP OS. For systems with more than one processor core, it is feasible to provide logical partitions having at least one processor core. It is also possible to run more than one logical partition respectively operating system on one core, e.g. by utilizing hyperthreading technologies.

For managing the hardware respectively physical resources, a hypervisor is sometimes provided. The hypervisor can be implemented in hardware, firmware, software or as any combination of these. An example for a hypervisor is the Xen-hypervisor. In many cases, the hypervisor allocates physical resources to logical partitions and provides interfaces between the hardware and guest operating systems running on the logical partitions. It may also provide the virtual machine seen by the guest operating systems. The hypervisor usually runs with the highest privilege level, in a so-called hypervisor mode, whereas guest operating systems run in a so-called supervisor mode with a lower level of privileges. In particular, the hypervisor usually controls access of the guest operating systems to the physical resources. In some cases it may even be useful to operate a hypervisor if only one operating system is being run.

A computer system may be implemented such that a guest operating systems does not even know that it is connected to a virtual machine under control of a hypervisor. It is also possible that the presence of the hypervisor is made transparent to the operating system. This approach is usually called paravirtualization. An operating system may also be run bare-metal directly on hardware without a hypervisor providing an additional layer of control structure.

In many cases, modern operating systems have a feature called virtual memory. Using virtual memory, it is possible to present a large and homogeneous memory structure to individual processes run under control of an operating system, e.g. user-applications, as well as to the operating system itself. In particular, virtual memory may present a larger amount of memory to applications than the actual physical random access memory (RAM) comprises. Should the memory requirements exceed the physical memory of the RAM, such virtual memory systems usually use a peripheral hardware storage device like a hard disk to "swap" data between the hard disk and the RAM. Virtual memory is usually directly controlled by an operating system independently of a hypervisor.

An operating system usually has its own model of physical resources present as well. Such a model may also pertain to a virtual machine presented by a hypervisor. The physical model does not necessarily describe the actual hardware the operating system runs on. In particular, physical addresses used by an operating system are not necessarily identical to the physical addresses of actual hardware as used by the hardware respectively a hypervisor. The physical addresses used by an operating system in its physical model are often called logical physical addresses to distinguish them over actual physical addresses. Moreover, different operating systems use different models of physical resources. Thus, for a computer system with a hypervisor, provisions have to be made to translate the physical model of an operating system, respectively, the logical physical addresses as seen by the operating system, into real or actual physical addresses. U.S. Pat. No. 6,877,158 B1 describes an example of a hypervisor mediating address translation between a physical system and different operating systems.

SUMMARY OF THE INVENTION

The present invention provides a memory management unit for a microprocessor system, a microprocessor system and a method for managing memory for a microprocessor system as described in the accompanying independent claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In the context of this specification, virtual memory may refer to a virtual memory system as provided by an operating system. Addresses of a virtual memory system may be referred to as virtual addresses. A physical memory model may be a model of physical memory provided by an operating system. It may image at least a part of the hardware of a computer system the operating system is running on or not. In particular, the physical model may correspond to a virtual machine presented to the operating system by a process with higher privilege level than the operating system, like a hypervisor. Addresses of a physical model may be referred to as logical physical addresses. Physical memory, actual memory or hardware may refer to memory respectively hardware devices which are physically present in the microprocessor system. Addresses of the hardware, in particular memory addresses, may be referred to as actual physical addresses. The term physical address may refer to both a logical physical address and an actual physical address.

A microprocessor system may be any computing device with at least one microprocessor having at least one computing core. The core may be one of the cores of multi-core processor, it may be the core of a single-core microprocessor or it may be one of the cores of a so-called SoC (System On a Chip). It may also be envisioned that the microprocessor system comprises one or more microprocessors, each microprocessor comprising one or more cores. A microprocessor system may comprise a digital signal processor (DSP) system as a microprocessor. A microprocessor may also be e.g. an x86 type processor, e.g. manufactured by Intel or AMD, or an IBM Power microprocessor, as well as be ARM-based or belong to any other kind of microprocessor type. In this context, field programmable gate arrays (FPGA) may also be seen as microprocessor systems if programmed accordingly. The microprocessor system may be implemented in a handheld device like a mobile phone or smartphone, embedded system, or a portable or non-portable computing system like e.g. a laptop, desktop computer or server system.

An operating system may be any system proving basic functionality and interfaces to applications, in particular user applications. Examples for operating system are for example various implementations of GNU/Linux or SmartDSP OS. A guest operating system may be an operating system running under control of a hypervisor.

A hypervisor, which may also be called virtual machine monitor (VMM), may allow one or more operating systems to run concurrently on a microprocessor system and provide hardware virtualization. A hypervisor may present a virtual machine to a guest operating system and may monitor the execution of the guest operating system or systems. In that way, multiple operating systems, including multiple instances of the same operating system, may share hardware resources. A hypervisor may run on bare hardware respectively actual hardware. It may allocate system resources across logical partitions to share physical resources such as CPUs respectively cores, direct access storage devices, memory, network resources, etc. It may be considered to implement a hypervisor in at least one of hardware, firmware and software, or any combination thereof. A hypervisor may run at a privilege level referred to as hypervisor mode, which may allow direct hardware access by the hypervisor. A hypervisor or an operating system may run as one process or may comprise a plurality of processes, which may run in parallel. Processes of a hypervisor may run in hypervisor mode. A supervisor mode may be provided. An operating system may comprise one or a plurality of processes. It may be considered that a guest operating system respectively one or more processes of a guest operating system run in supervisor mode. More than one operating system may run in supervisor mode. A supervisor mode may have a lower privilege level than the hypervisor mode. In particular, it may be envisioned that a guest operating system in supervisor mode is not allowed to directly access hardware or may have limited hardware access e.g., to a defined subset of addresses. There may be different supervisor modes defined with different privilege levels for different logical partitions respectively operating systems. It may be contemplated that one or more processes are being run under a supervisor mode. Processes run under a supervisor mode may run at a privilege level of the supervisor mode or at a privilege level which is lower than a supervisor mode, e.g. which may provide a lower level of access rights to hardware and/or software or hardware interfaces. A process running in supervisor mode, e.g. a guest operating system, may run respectively control processes run under supervisor mode. A process run under supervisor mode may e.g. be a daemon running in the background providing system services or a user application. There may be defined a privilege level for processes running under supervisor mode, which may e.g. be defined as a user mode. There may be defined one or more different privilege levels for processes which may be run under supervisor mode, e.g. different user modes. A read access may be a direct read access by software or a hardware generated access. A write access may be a direct write access by software or a hardware generated access.

A register table may comprise one or more registers. A register table indicating information may contain the information indicated directly. It may be envisioned that a register table indicating information contains address information directly or indirectly pointing at a memory region in which the indicated information may be stored. In particular, a register table may contain one or more pointers to one or more addresses or address ranges of a memory region. The memory region may e.g. be part of the regular physical memory of the microprocessor system, the RAM, or may be provided separately, e.g. as a dedicated memory. A dedicated memory may for example be provided with a memory management unit (MMU). A register table may indicate a range of addresses respectively a memory range. The memory range respectively range of addresses indicated may be continuous respectively fragmented. It may be contemplated that the memory range respectively range of addresses is discontinuous respectively fragmented. Generally, unless specified otherwise, an address may be a virtual, logical physical or actual physical address. To reconfigure information indicated in a register table may comprise writing data into the register table directly. It may also comprise writing data to a memory region the register table points to. Write access to a register table may comprise direct write access to reconfigure information in the register table. It may be considered that write access to a register table comprises write access to an address or an address range pointed to by the register table.

Figure 1:
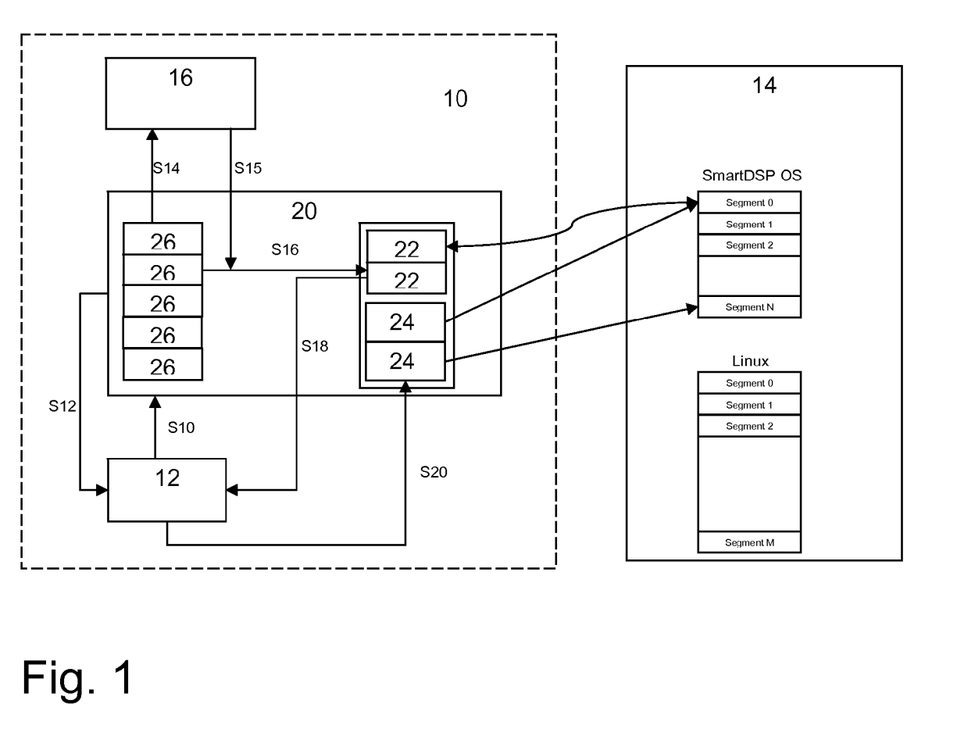
FIG. 1 schematically shows a microprocessor system with a memory management unit and a method of managing memory.

FIG. 1 schematically shows a microprocessor system 10 which may have at least one computing core 12, a physical memory 14 and a cache 16. It is feasible that the core 12 may access the memory 14 via a memory management unit 20. There may also be a direct connection between core 12 and memory 14. Memory 14 may be modelled differently by different operating systems. As indicated for a Linux operating system and for a SmartDSP OS in FIG. 1, different operating system may provide different segmentations of the memory 14. In particular, the microprocessor system 10 may be a DSP system, the core 12 being a DSP core. A hypervisor may provide one or more logical partitions of the microprocessor system and may monitor one or more guest operating systems. The hypervisor may access respectively utilize the memory management unit 20. The hypervisor may run on the core 12 or on any other suitable computing device.

The memory management unit 20 may be connected or connectable to the at least one processor core of the microprocessor system 10 and may be connected or connectable to the physical memory 14 of the microprocessor system 10. It may be considered that the memory management unit 20 is being adapted to selectively operate in a hypervisor mode or in a supervisor mode. The mode the memory management unit is operate in may be selectively determined, e.g. by an incoming request. The memory management unit 20 may be adapted to respond to read or write requests of processes running on the core 12 respectively the microprocessor system 12 depending on whether it and/or the process operates in the hypervisor mode or the supervisor mode. The hypervisor mode and the supervisor mode may have different privilege levels of access to hardware. The memory management unit 20 may comprise a first register table 22 indicating physical address information for mapping at least one logical physical address and at least one actual physical address onto each other and a second register table 24 indicating an allowed address range of physical addresses which are accessible to a process running in or under supervisor mode. In particular, the second register table 24 may directly or indirectly point to or indicate a configuration memory region. The configuration memory region may store possible configurations of the first register table 22. It may be contemplated that the possible configurations of the first register table 22 comprise all configurations of the first register table 22 which are allowable for the corresponding process running under or in supervisor mode. A configuration may provide information for mapping at least one logical physical address and at least one physical address onto each other. A configuration may identify one or more logical addresses and one or more corresponding actual physical addresses which are to be mapped onto each other. It may be envisioned that a configuration represents a logical address and a size of a range of logical addresses beginning at the logical address and a corresponding physical address and a size of the range of physical addresses as a mapping. The form of the mapping may be dependent on a memory model of a process running in supervisor mode, in particular a guest operating system. It may be envisioned that the mapping is based on a hardware structure. The mapping may represent a page and/or segmentation model of memory. The allowed address range respectively the configurations may represent or indicate an address range, in particular a memory range, the process running in or under supervisor mode may be allowed to read from and/or write to respectively may have read access and/or write access to. It may be considered that the process running in or under supervisor mode is not allowed to access a physical address not mapped in the configuration memory region respectively not lying in the allowed range of addresses. The allowed address range may correspond to a range of actual physical addresses. The allowed address range may comprise two or more fragmented ranges of physical addresses. Data stored in the configuration memory region may be considered to represent the allowed address range. In particular, a table, e.g. a table stored in the configuration memory region, comprising a mapping between actual physical addresses and corresponding logical addresses may be considered to represent or contain the allowed address range. The memory management unit 20 may be adapted to prevent write access to the second register table 24 of a process not in hypervisor mode. It may be contemplated that the memory management unit 20 is adapeted to prevent write access of a process not in hypervisor mode to a memory region pointed to by the second register table 24 respectively the configuration memory region in which possible configurations of the first register table 22 are stored. The memory management unit 20 may further be adapted to allow write access to the first register table 22 of a process running in or under supervisor mode to reconfigure the physical address information in the first register table 22 with memory mapping information relating to at least one physical address, if the at least one physical address is in the allowed address range. It is feasible that the memory management unit 20 is adapted to prevent write access to the first register table 22 of the process running in or under supervisor mode if the at least one physical address is not in the allowed address range. The at least one physical address may be an actual physical address or a logical physical address.

Memory mapping information may be information stored in the configuration memory region. In particular, memory mapping information may be considered to correspond to or to contain one or more configuration, e.g. one or more possible configurations of the first register table 22. Memory mapping information relating to one or more logical addresses and/or one or more physical addresses may be read, e.g. by a process running in or under supervisor mode, from the configuration memory region indicated by the second register table 24. In particular, the process running in or under supervisor mode may be allowed to read memory mapping information. It may be considered that the configuration memory region is a region of memory 14. An additional dedicated memory may be provided for the configuration memory region. The configuration memory region may be write-protected such that only a process in hypervisor mode may have write access to it. It may be contemplated that the first register table 22 may only be reconfigured or updated with memory mapping information read from the configuration memory region. If the memory mapping information could be read from the configuration memory region, i.e. the configuration memory region contains corresponding mapping information, it may be considered that write access to the first register table 22 may be allowed to the process running in or under supervisor mode. Write access may be considered to be prevented for at least one logical or actual physical address not mapped by mapping information in the configuration memory region.

The memory management unit 20 may be adapted to check whether a write access to the first register table 22 requested by a process running in or under supervisor mode relates to the allowed range of addresses. The memory mapping information may comprise a mapping of at least one logical physical address and at least one actual physical address onto each other. It may be contemplated that the memory mapping information indicates how to change address information indicated by the first register table 22. It may be envisioned that data stored in the first register table 22 is changed and/or data stored in a memory address or memory range the first register table 22 points to is changed during reconfiguration. A process running in a supervisor mode may be an operating system. A hypervisor may be running in hypervisor mode. The memory management unit 20 may be configurable to determine whether a reconfiguration of the first register table 22 is performed in hypervisor mode or in supervisor mode. In hypervisor mode the first register table 22 may be accessed directly to write without checking the second register table 24.

The first register table 22 may be a LRAT (Logical-to-Real Address Translation) register table containing information regarding a relation between a given number of logical physical addresses and actual or real physical addresses. The first register table 22 may comprise one or more register entries. In particular, the LRAT register table 22 may indicate information for mapping memory page information of the logical physical memory as seen by the operating system running in supervisor mode into page information regarding the actual physical memory 14. It may be envisioned that the first register table 22 indicates physical address information for more than one operating system. The first register table 22 may be adapted to map logical physical addresses from a segmentation model to a segmentation model of the actual physical address, or from a page model to a segmentation model, or a segmentation model to a page model. The LRAT register table 22 may not be able to indicate information spanning the whole range of memory available, but may indicate information for mapping addresses or address ranges which are commonly or have been recently accessed. A LRAT page fault error may be indicated or signalled to the core 12 by the memory management unit 20 in the case a read access to the LRAT register table 22 does not find a mapping of an address as desired. The memory management unit 20 may be adapted to allow write access to the first register table 22 of a process running in hypervisor mode, in particular of a hypervisor. It may be considered that a process or processes in supervisor mode may be allowed read access to the first register table 22. To reconfigure the first register table 22 respectively information pointed to by register table 22 opcodes of the microprocessor system may be used. In particular, there may be used opcodes which are already present in a common microprocessor system, or there may be defined specific opcodes to access the first register table 22. Specific opcodes may also indicate or instruct a check against the second register table 24 whether a desired write access is allowable. Such opcodes may be provided with an adapted core 12 or microprocessor system 10. An opcode may be defined reading memory mapping information from a configuration memory region in or under supervisor mode. It may be envisioned that an opcode is defined writing memory mapping information into the first register table 22. It is feasible to provide an individual opcode which instructs reading memory mapping information and writing the information read into the first register table 22.

The second register table 24 may be a current operating system memory register table. It may indicate an address range of physical addresses accessible to a guest operating system running in or under supervisor mode. In particular, the second register table 24 may comprise a Current OS table Base Address Register (COSBAR) and Current OS table Size Register (COSSR). It may be envisioned that the COSBAR indicates a memory address, which may be an actual physical memory address. It may point to an address in which memory allocation information is stored. The address may indicate the beginning of a memory range in which memory allocation information is stored. The COSSR may contain information regarding the size of the address range containing memory allocation information. The second register table 24 may indicate information regarding the size and actual physical address of memory allocated to a logical partition respectively a guest operating system. It may contain information regarding the memory allocated to more than one operating system respectively logical partition. It may be envisioned that only a hypervisor or a process running in hypervisor mode may write to the second register table 24 and/or the memory range indicated respectively pointed to by the second register table 24. The memory range pointed to may itself point to a memory or address range, namely the allowed address range. The second register table 24 may point to or indicate a configuration memory region containing allowable configurations of the first register table 22 for a given supervisor mode. It may be envisioned to provide more than one COSBAR and corresponding COSSR to point to more than one memory range. The second register table 24 may be adapted to indicate information, in particular an allowed address range, for one operating system respectively logical partition. It may be envisioned that the second register table 24 is adapted to indicate allowed address ranges for one or more or two or more processes in supervisor mode, in particular operating systems. It may be considered that the second register table 24 indicates two or more configuration memory regions, each configuration memory region representing an allowed address range for a different process running in or under supervisor mode, in particular for different operating systems as shown in FIG. 1 for a GNU/Linux operating system and a SmartDSP operating system. The segments shown for the individual operating systems in FIG. 1 may correspond to a segment-based mapping of logical physical addresses and actual physical addresses onto each other. The segmentations provided by different operating systems may differ from each other and may depend on a memory model used by the operating system in question. A configuration memory region may contain a mapping of actual physical addressed allocated to respectively allowed for a guest operating system and of logical physical addresses onto each other, the logical physical addresses being determined based on the memory model used by the guest operating system. Addresses respectively address ranges pointed to by the second register table 24 may be part of the normal physical RAM or may be dedicated memory provided separately from the RAM.

The memory management unit 20 may comprise a third register table 26 indicating virtual address information for mapping at least on virtual address and at least one physical address onto each other. The at least one physical address may be an actual physical address or a logical physical address. The memory management unit 20 may be adapted to allow read and/or write access to the third register table 26 of a process running in or under supervisor mode, in particular an operating system. The at least one actual physical address may be an address of physical memory 14. It may be envisioned that the third register table 26 indicates virtual address information for one or more than one processes running in or under supervisor mode respectively operating system. In the case shown in FIG. 1, the third register table 26 indicates virtual address information for mapping at least one virtual address and at least on logical physical address onto each other. It may be considered that the first and/or third register table 22, 26 does not provide a complete mapping of addresses. Rather, the first and/or second register table 22, 26 may provide a mapping for a subset of virtual, logical physical respectively actual physical addresses.

A method of memory management for a microprocessor system 10 with at least one processor core 12, a physical memory 14, and a memory management unit 20 as described above may be considered. The memory management unit 20 may be connected to the core 12 and the physical memory 14. A request for write access to the first register table 22 by a process running in or under supervisor mode to reconfigure the address information in the first register table 22 with memory mapping information relating to at least one physical address may be received. The requested write access may be allowed if the at least one physical address the memory mapping information relates to is within the allowed address range for the process running in or under supervisor mode. The process running in or under supervisor mode may request write access to the first register table 22 if a read access to the first register table 22 for mapping a logical physical address to an actual physical address was not successful. It may be assumed that read access was not successful, if the first register table 22 did not indicate physical address information for mapping a given logical physical address to an actual physical address. The given logical address may correspond to a given virtual address. It may be considered that the memory mapping information relates to at least one logical physical address mapped to the at least actual physical address. The mapping may be defined by the memory mapping information, which may be stored and read from a configuration memory region the second register table 24 points to or indicates.

In particular, a process in or under supervisor mode respectively a guest operating system running on core 12 may access the third register table 26, which may indicate virtual address information (S10). The process running in or under supervisor mode may refer to a given virtual address. The virtual address may be used during execution of program running under the guest operating system or the guest operating system itself. With the help of the third register table 26, the virtual address may be translated into a logical physical address. Should a translation of the virtual address into a logical address not be possible, e.g. because the guest operating system tries to access an undefined virtual address, an exception signal may be issued to the core 12 (S12). In the case a translation may be performed using the third register table 26 it is optionally possible to access cache 16, which may provide quick information regarding the desired addresses (S14). It may be considered to access the physical memory 14 for translation of the virtual address into a logical address. Should the address looked for not be in the cache, the LART first register table 22 may be accessed (S15, S16). In the case that no cache is used or that an address to be looked up is not cacheable, the first register table may be directly accessed (S16).

If the first register table 22 contains or indicates information mapping the logical physical address onto an actual physical address, an access to the actual address may be possible. Before the guest operating system is allowed to access the actual hardware, a check may be performed whether the actual address lies in the allowed address range for the guest operating system. Should this not be the case, access to the actual address may be denied. The check may be performed by the hypervisor or by a hardware implementation, e.g. by the memory management unit 20. In the case that the LRAT register table 22 does not provide address information mapping the logical physical address corresponding to the virtual address onto an actual physical address, an exception may be signalled to the core 12 (S18). The exception may signal a page fault.

A page fault signal may be caught by the hypervisor or by the guest operating system. If the hypervisor catches the signal, reconfiguration of the first register table 22 may be performed in hypervisor mode. The hypervisor may delegate the task of reconfiguration to the guest operating system. The guest operating system may perform reconfiguration in supervisor mode. It may be envisioned that the guest operating system requests the hypervisor to perform reconfiguration. Reconfiguration in hypervisor mode may be performed directly, as the hypervisor mode may allow direct write access to the LART register table 22 (S20). In supervisor mode, a request for write access to the first register table 22 may be received. The request may be issued by the core 12 and it may be received by the memory management unit 20. The core 12 may issue the request by executing a program code respectively opcodes. The request may directly specify which physical address or physical addresses it refers to. If the physical address or addresses, which may be actual physical addresses, lie within the allowed address range as indicated by the second register table 24, write access of the process in supervisor mode may be granted and the first register table 22 may be updated accordingly. It may be envisioned that memory mapping information is read from the configuration memory region the second register table 24 points to or indicates. Memory mapping information may be read by a process running in or under supervisor mode, which may have read access for the memory mapping information. In particular, a mapping for a logical address not stored in the first register table 22 may be read from the configuration memory region. If the configuration memory region comprises the corresponding mapping, the first register table 22 may be reconfigured with the corresponding mapping information. In the case that the configuration memory region does not contain such a mapping, this may be considered as indication that the process running in or under supervisor is trying to access non-allowed addresses. In this case, it may be considered that write access to reconfigure the first register table 22 is prevented. In particular, it may be envisioned that the first register table 22 may only be reconfigured by a process running in or under supervisor mode with information being stored and read from the configuration memory region. The actual physical address mapped to the logical address corresponding to the virtual address may be passed to process respectively to the core directly, or the process may be redirected to read the actual physical address from the now updated LART register table 22. If the physical address requested lies outside of the allowed address range, the write access may be denied. Translation from a logical physical address to an actual physical address may be performed for this operation. For translation, it may be considered to access the physical memory 14, which may include required translation information respectively mapping information between the complete logical physical memory as modelled by the guest operating system and the actual physical memory (see arrows without numbers). The method provides a good separation of hypervisor registers and registers for processes in supervisor mode. In particular, the third register table 26 may be associated to the supervisor mode, whereas the second register table 24 may be associated to the hypervisor mode.

Figure 2:
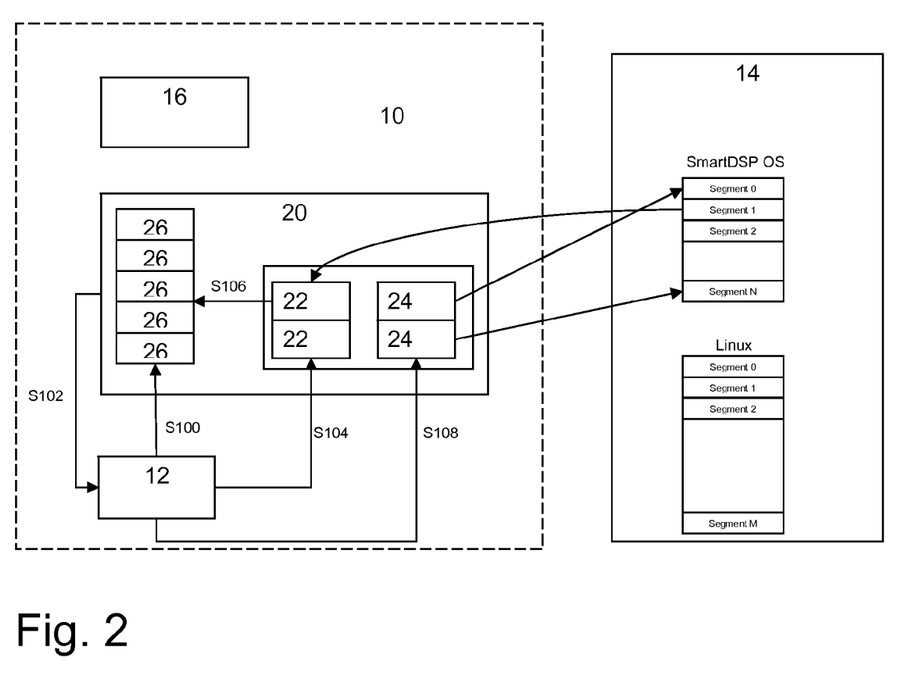
FIG. 2 schematically shows a variant of a microprocessor system with a memory management unit and a method of managing memory.

FIG. 2 shows a microprocessor system 12 which is very similar to the one described in FIG. 1. A difference between the system shown in FIG. 2 and the system shown in FIG. 1 lies in the use of the third register table 26. According to the variant shown in FIG. 2, the third register table 26 may indicate virtual address information for mapping at least one virtual address and at least one actual physical address onto each other.

A method for memory management building on the features described above will now be described with reference to FIG. 2. The method may comprise the feature that after a write access of the process running in or under supervisor mode to the first register table 22 has been carried out (see e.g. S104 described below), the third register table 26 indicating virtual address information for mapping at least one virtual address and at least one actual physical address onto each other is reconfigured to indicate a mapping of a virtual address the at least one actual physical address the memory mapping information refers to. The method may in particular be applicable to one of the microprocessor systems as described above.

It may be envisioned that a process running in or under supervisor mode, which may run on core 12, may provide a virtual address to be accessed and which has to be translated to an actual physical address. A read access to the third register table 26 may be performed (S100). If the read access provides a mapping between the virtual address and an actual physical address, the translation has been successful. In the case of an error, e.g. due to non-defined addresses, an error signal respectively an exception may be thrown to the process running in or under supervisor mode (S102). Similarly to the method described above, the cache 16 may be optionally accessed (not shown).

If no mapping of the virtual address to an actual physical address could be performed, a translation of the virtual address into a logical physical address may be performed by the guest operating system. To translate the logical physical address into an actual physical address, a read access to the first register table 22 may be performed in supervisor mode (S104). If the LRAT register table 22 contains physical address information mapping the logical physical address corresponding to the virtual address onto an actual physical address, the actual physical address may be returned. In this case, the third register table 26 may be reconfigured to include a mapping of the virtual address onto the returned actual physical address (S106). If the read access to the LRAT register table 22 did not provide the desired mapping, a reconfiguration of the LRAT register table 22 may be performed. As described above, the reconfiguration may be performed in hypervisor mode or supervisor mode. If it is performed in supervisor mode, the second register table 24 may be checked whether the physical address or addresses to be mapped are within the allowed address range for the guest operating system (S108). If this is not the case, the request to reconfigure the first register table 22 may be denied. If the addresses are in the allowed address range, a reconfiguration may be performed as described above. In particular, memory mapping information may be read from a configuration memory region indicated by the second register table 24. After reconfiguration, the third register table 26 may be reconfigured accordingly (similar to S106).

There may be envisioned a microprocessor system 10 comprising at least one processor core 12 and a memory management unit 20 as described above, the memory management unit 20 being connected to the processor core 12. The memory management unit may be connected to a physical memory 16. A microprocessor system adapted to perform one of the methods described above may be considered.

According to the system and methods described above, it is possible for a guest operating system or a process running in or under supervisor mode to read access a LRAT register table without the need to send an access request to a hypervisor, reducing overhead. A LRAT register table may be updated by a guest operating system instead of the hypervisor, further reducing overhead. At the same time, protection of resources against other operating systems is ensured.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. A hypervisor providing a virtual machine may be layered between an operating system and the actual hardware.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the memory management unit may be constructed as a single unit or be distributed over several components. In particular, the register tables of the management unit may be implemented in several modules. For example, the LRAT register may be implemented on one unit, and the second register may be implemented on a separate unit. The unit may be interconnected. Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the memory management unit may be implemented on a chip with the core. Alternatively, the examples may be implemented as any number of separate integrated circuits or separate devices interconnected with each other in a suitable manner. For example, core and memory management unit may be separate unit which are connected to each other.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

In the foregoing specification, the invention has been described with reference to specific examples of embodiments of the invention. It will, however, be evident that various modifications and changes may be made therein without departing from the broader spirit and scope of the invention as set forth in the appended claims.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A device comprising a memory management unit, the memory management unit comprising:
   a first storage location to indicate physical address information mapping logical physical addresses to actual physical addresses,
   the memory management unit to determine whether a write access to the first storage location is allowable, the access to store memory mapping information relating to a first actual physical address, the memory management unit to prevent the write access by a process that is running in or under a supervisor mode if the first actual physical address is not in an allowed address range of actual physical addresses, and to not prevent the write access to the first storage location by the process if the first actual physical address is in the allowed address range; and
   a second storage location to indicate the allowed address range, the memory management unit to prevent a write access to the second storage location by a process that is not running in a hypervisor mode.

2. The device of claim 1, wherein the memory mapping information is stored in a configuration memory region indicated by the second storage location.

3. The device of claim 1, wherein the memory management unit is further to allow a read access to the memory mapping information by the process that is running in or under the supervisor mode.

4. The device of claim 1, wherein the second storage location is to indicate allowed address ranges for two or more processes that are running in or under the supervisor mode.

5. The device of claim 1, wherein the memory management unit further comprises a third storage location to indicate virtual address information mapping virtual addresses to physical addresses.

6. The device of claim 5, wherein the third storage location is to indicate mapping a first virtual address to the first actual physical address.

7. The device claim 5, wherein the memory management unit is further to allow a write access to the third storage location by the process that is running in or under the supervisor mode.

8. The device of claim 1, wherein the first actual physical address is an address of a physical memory.

9. The device of claim 1, wherein the memory management unit is further to allow a write access to the first storage location by a process that is running in the hypervisor mode.

10. A method comprising:
providing a first storage location at a memory management unit, the first storage location storing physical address information mapping logical physical addresses to actual physical addresses,
determining at the memory management unit whether a write access to the first storage location is allowable, the access to store memory mapping information relating to a first actual physical address, wherein the memory management unit prevents the write access by a process that is running in or under a supervisor mode if the first actual physical address is not in an allowed address range of actual physical addresses, and the memory management unit does not prevent the write access to the first storage location by the process if the first actual physical address is in the allowed address range; and
providing a second storage location at the memory management unit, the second storage location storing the allowed address range, wherein the memory management unit prevents a write access to the second storage location by a process that is not running in a hypervisor mode.

11. The method of claim 10, wherein the memory mapping information is stored in a configuration memory region indicated by the second storage location.

12. The method of claim 10, further comprising allowing a read access to the memory mapping information by the process that is running in or under the supervisor mode.

13. The method of claim 10, further comprising the second storage location indicating allowed address ranges for two or more processes that are running in or under the supervisor mode.

14. The method of claim 10, further comprising a third storage location at the memory management unit, the third storage location indicating virtual address information mapping virtual addresses to physical addresses.

15. The method of claim 14, further comprising allowing a write access to the third storage location by a process that is running in or under the supervisor mode.

16. The method of claim 10, wherein the first actual physical address is an address of a physical memory.

17. The method of claim 10, further comprising allowing a write access to the first storage location of a process that is running in the hypervisor mode.

18. A system comprising:
a memory;
a first storage location to indicate physical address information mapping logical physical addresses to actual physical addresses;
a second storage location to indicate an allowed address range; and
a memory management unit coupled to the memory, the memory management unit to:
determine whether a write access to the first storage location, the access to store memory mapping information relating to a first actual physical address, the memory management unit to prevent the write access by a process that is running in or under a supervisor mode if the first actual physical address is not in the allowed address range of actual physical addresses, and to not prevent the write access to the first storage location by the process if the first actual physical address is in the allowed address range; and
prevent a write access to the second storage location by a process that is not running in a hypervisor mode.

19. The system of claim 18, wherein the memory mapping information is stored in a configuration memory region indicated by the second storage location.

20. The system of claim 18, wherein the memory management unit further comprises a third storage location to indicate virtual address information mapping virtual addresses to physical addresses.

* * * * *